(12) United States Patent
Tanno et al.

(10) Patent No.: US 7,735,532 B2
(45) Date of Patent: *Jun. 15, 2010

(54) LOW NOISE PNEUMATIC TIRE

(75) Inventors: Atsushi Tanno, Hiratsuka (JP); Toshiyuki Ikeda, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1048 days.

This patent is subject to a terminal disclaimer.

(21) Appl. No.: 10/580,518

(22) PCT Filed: Dec. 15, 2004

(86) PCT No.: PCT/JP2004/018697

§ 371 (c)(1),
(2), (4) Date: May 24, 2006

(87) PCT Pub. No.: WO2005/058616

PCT Pub. Date: Jun. 30, 2005

(65) Prior Publication Data

US 2007/0074798 A1   Apr. 5, 2007

(30) Foreign Application Priority Data

Dec. 16, 2003   (JP) .............................. 2003-418317

(51) Int. Cl.
*B60C 5/00* (2006.01)
*B60C 19/00* (2006.01)

(52) U.S. Cl. ...................................... 152/157; 152/450

(58) Field of Classification Search ................. 152/450, 152/155–157
See application file for complete search history.

(56) References Cited

U.S. PATENT DOCUMENTS

| | | | | |
|---|---|---|---|---|
| 4,399,851 A | * | 8/1983 | Bschorr | 152/156 |
| 7,140,412 B2 | * | 11/2006 | Tanno | 152/450 |
| 7,556,075 B2 | * | 7/2009 | Tanno | 152/155 |

FOREIGN PATENT DOCUMENTS

| | | |
|---|---|---|
| EP | 0 870 631 A2 * | 10/1998 |
| EP | 1 253 025 A2 * | 10/2002 |
| JP | 2003-226104 | 8/2003 |
| JP | 2003-252003 | 9/2003 |
| JP | 2004-291855 | 10/2004 |

* cited by examiner

*Primary Examiner*—Adrienne C Johnstone
(74) *Attorney, Agent, or Firm*—Greer, Burns & Crain, Ltd

(57) ABSTRACT

Disclosed is a low noise pneumatic tire having a configuration where, while installation work of a strip-shaped sound absorbent is simple, it is possible to simultaneously reduce cavity resonance and high-frequency noise, and thereby to effectively reduce noise when a vehicle is traveling. In the low noise pneumatic tire of the present invention, the strip-shaped sound absorbent is attached to an annular elastic fixing band, and then is installed onto an inner surface of a tread of the tire taking advantage of the elastic force of the annular elastic fixing band. The strip-shaped sound absorbent is formed of at least two kinds of porous materials whose sound absorption characteristics with respect to frequencies are different from one another.

13 Claims, 5 Drawing Sheets

LOW NOISE PNEUMATIC TIRE

TECHNICAL FIELD

The present invention relates to a low noise pneumatic tire provided with a strip-shaped sound absorbent, and more specifically, relates to a low noise pneumatic tire configured to simultaneously reduce cavity resonance and high-frequency noise, and thereby to effectively reduce noise when a vehicle is traveling.

BACKGROUND ART

As one of causes of noise generation in a pneumatic tire, there is cavity resonance resulting from vibration of air filled inside the tire. This cavity resonance is generated because, when the tire is rotated, the tread portion of the tire vibrates due to irregularities on a road surface, and consequently, the vibration of the tread portion vibrates air inside the tire.

As a method of reducing noise resulting from a cavity resonance phenomenon as described above, there has been proposed one where a sound absorbent is added inside the tire to absorb the cavity resonance (for example, refer to Patent Document 1). However, in the above method, the sound absorbent is pasted to an inner surface of the tire, or to an outer peripheral surface of a rim. Therefore, the above method is disadvantageous in that installation work of the sound absorbent is troublesome.

Additionally, in the above method, while cavity resonance is suppressed by the sound absorbent, noise generated inside a tire when a vehicle is traveling is not limited to the cavity resonance, but includes high-frequency noise and the like in frequency bands different from that of the cavity resonance. However, although the sound absorbent has excellent sound absorption characteristics with respect to a particular frequency band, it does not necessarily have sufficient sound absorption characteristics with respect to other frequency bands. Therefore, even though it is possible to reduce the cavity resonance, it is difficult to reduce high-frequency noise and the like.

[Patent Document 1] Japanese patent application *Kokai* publication No. Sho64-78902

DISCLOSURE OF THE INVENTION

An object of the present invention is to provide a low noise pneumatic tire having a configuration where, while installation work of a strip-shaped sound absorbent is simple, it is possible to simultaneously reduce cavity resonance and high-frequency noise, and thereby to effectively reduce noise when a vehicle is traveling.

A low noise pneumatic tire of the present invention for achieving the above object is characterized in that a strip-shaped sound absorbent is attached to an annular elastic fixing band, and then is installed onto an inner surface of a tread of the tire taking advantage of the elastic force of the annular elastic fixing band, the strip-shaped sound absorbent being formed of porous materials of at least two kinds whose sound absorption characteristics with respect to frequencies are different from one another.

In other words, the low noise pneumatic tire of the present invention is characterized in that the strip-shaped sound absorbent is attached to the annular elastic fixing band, and then is installed onto the inner surface of the tread of the tire taking advantage of the elastic force of the annular elastic fixing band, the strip-shaped sound absorbent having a mixed composition of sound absorbing portions of at least two kinds formed of porous materials of at least two kinds whose sound absorption characteristics with respect to frequencies are different from one another. The sound absorbing portions of at least two kinds are arranged in a manner that they are alternately aligned in a circumferential direction or in the width direction of the tire. The sound absorbing portions of at least two kinds are disposed in a mixed manner in the plane direction of the sound absorbent.

More specifically, the low noise pneumatic tire of the present invention is characterized in that the strip-shaped sound absorbent is attached to an annular elastic fixing band, and then is installed onto an entire circumference of the inner surface of the tread of the tire taking advantage of the elastic force of the annular elastic fixing band, the strip-shaped sound absorbent having a mixed composition of a sound absorbing portion formed of a first porous material whose sound absorbing coefficient at a frequency of 200 Hz is not less than 20%, and another sound absorbing portion formed of a second porous material whose sound absorbing coefficient at a frequency of 1 kHz is not less than 25%. The sound absorbing portions formed respectively of the first and second porous materials are alternately aligned in the circumferential direction or in the width direction of the tire. The sound absorbing portions formed respectively of the first and second porous materials are disposed in a mixed manner in the plane direction of the sound absorbent. In this case, it is preferable that the surface area of the sound absorbing portions formed of the first porous material be between 30% and 70% of the surface area of the entire strip-shaped sound absorbent, and that the surface area of the sound absorbing portions formed of the second porous material be between 30% and 70% of the surface area of the entire strip-shaped sound absorbent.

Additionally, another low noise pneumatic tire of the present invention is characterized in that a strip-shaped sound absorbent is attached to an annular elastic fixing band, and then is installed onto the entire circumference of the inner surface of a tread of the tire taking advantage of the elastic force of the annular elastic fixing band, the strip-shaped sound absorbent having a mixed composition of a sound absorbing portion formed of a first porous material whose sound absorbing coefficient at a frequency of 200 Hz is not less than 20%, another sound absorbing portion formed of a second porous material whose sound absorbing coefficient at a frequency of 1 kHz is not less than 25%, and still another sound absorbing portion formed of a third porous material whose sound absorbing coefficient at a frequency of 1.5 kHz is not less than 30%. The sound absorbing portions formed respectively of the first, second and third porous materials are alternately aligned in the circumferential direction or in the width direction of the tire. These sound absorbing portions formed respectively of the first, second and third porous materials are disposed in a mixed manner in the plane direction of the sound absorbent. In this case, it is preferable that the surface area of the sound absorbing portions formed of the first porous material be between 30% and 50% of the entire strip-shaped sound absorbent, that the surface area of the sound absorbing portions formed of the second porous material is between 20% and 30% of the entire strip-shaped sound absorbent, and that the surface area of the sound absorbing portions formed of the third porous material is between 20% and 50% of the surface area of the entire strip-shaped sound absorbent.

In the present invention, the surface areas of the sound absorbing portions formed of porous materials and the surface area of the strip-shaped sound absorbent are apparent surface areas obtained on the supposition that the sound absorbing portions and the strip-shaped sound absorbent are solid articles, and also, are surface areas of portions thereof exposed to the inside of the cavity portion of the pneumatic tire.

According to the present invention, because a strip-shaped sound absorbent formed of at least two kinds of porous materials whose sound absorption characteristics with respect to frequencies are different from one another is installed onto the inner surface of the tread of the pneumatic tire, the pneumatic tire can have an excellent sound absorbing effect in a frequency band wider than a case using a single porous material. That is, the pneumatic tire according to the present invention can simultaneously reduce cavity resonance and high-frequency noise, and thereby can effectively reduce noise when a vehicle is traveling. Moreover, in the pneumatic tire according to the present invention, installation work of the strip-shaped sound absorbent is extremely simple because the strip-shaped sound absorbent is attached to an annular elastic fixing band, and then is installed onto the inner surface of the tread taking advantage of the elastic force of the annular elastic fixing band.

DESCRIPTION OF THE PREFERRED EMBODIMENTS

Hereinbelow, detailed descriptions will be given of configurations of the present invention with reference to the accompanying drawings.

Figure 1:
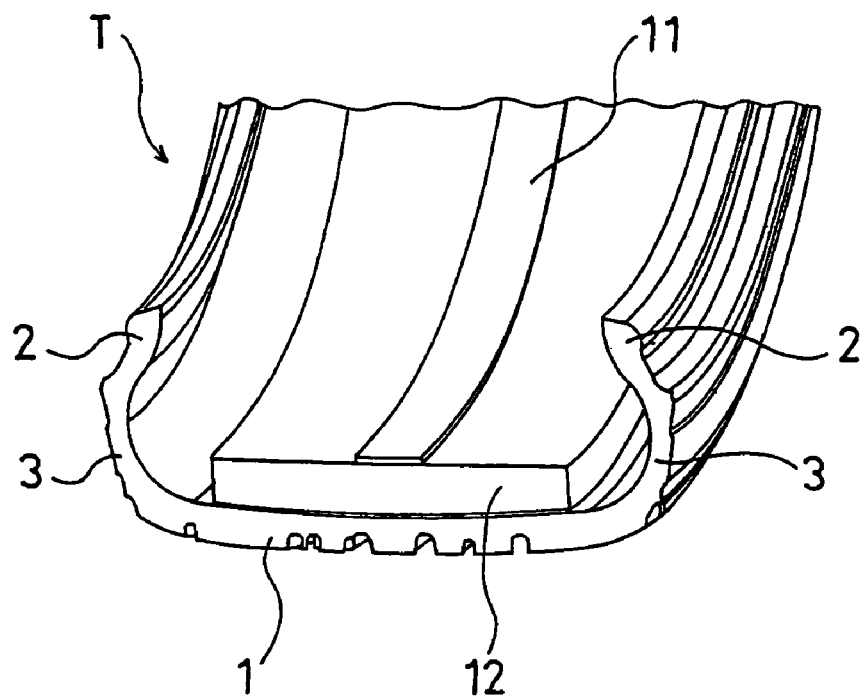
FIG. 1 is a perspective cross-cut view showing a low noise pneumatic tire of an embodiment of the present invention.
Figure 2:
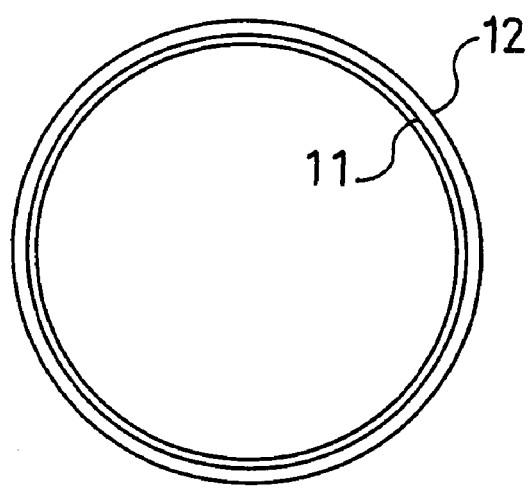
FIG. 2 is a side view showing a strip-shaped sound absorbent and an elastic fixing band which are attached onto the inner surface of the tire.
Figure 3A:
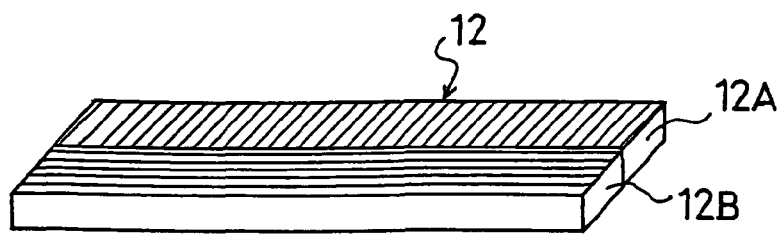
FIGS. 3A to 3D are perspective views each showing a strip-shaped sound absorbent formed of two kinds of porous materials in a linearly unfolded state.
Figure 3B:
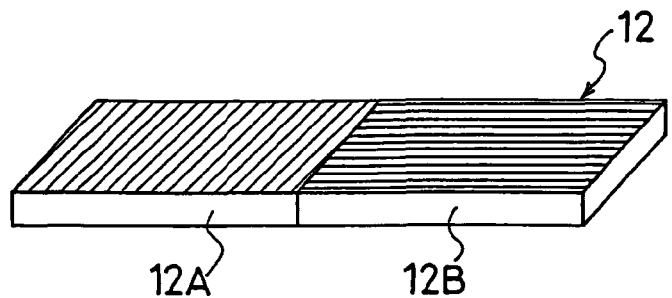
Figure 3C:
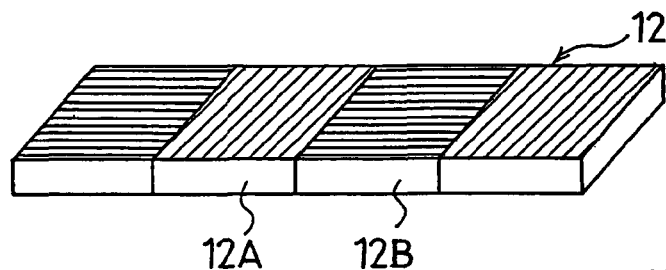
Figure 3D:
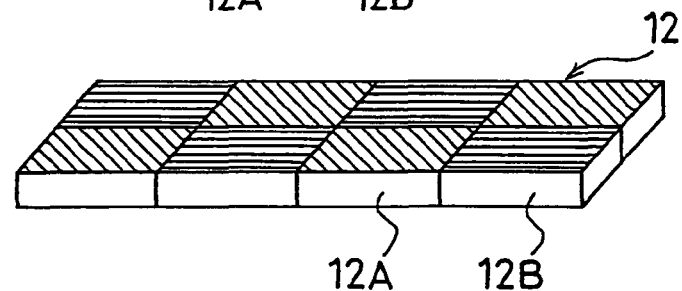

FIG. 1 shows a low noise pneumatic tire of a first embodiment of the present invention, and FIG. 2 shows a strip-shaped sound absorbent installed onto the inner surface of the tire, and an elastic fixing band. In FIG. 1, a pneumatic tire T is provided with a tread portion 1, and a pair of left and right bead portions 2, and sidewall portions 3. Each side portion 3 links the tread portion 1 and the bead portion 2 with each other.

By means of an elastic fixing band 11, onto the inner surface of the tread portion 1, a strip-shaped sound absorbent 12 is installed, which is formed of at least two kinds of porous materials whose sound absorbing characteristics with respect to each frequency are different from one another. The strip-shaped sound absorbent 12 exists along the entire circumference of the tread portion 1, and is attached to the elastic fixing band 11 (refer to FIG. 2). There, the strip-shaped sound absorbent 12 is attached onto the inner surface of the tread of the already vulcanized pneumatic tire T taking advantage of the elastic force of the elastic fixing band 11, and therefore, installation work of the strip-shaped sound absorbent 12 is extremely simple.

The elastic fixing band 11 may be an annular body having no ends, or may be one obtained by connecting both ends of a belt rail in the longitudinal direction thereof and then processing the belt rail into an annular form. In particular, in a case where the elastic fixing band 11 is formed of a belt rail, it is possible to adjust the circumferential length thereof in accordance with the size of the tire. For a material constituting the elastic fixing band 11, synthetic resin such as polypropylene resin can be used. In particular, in a case where polypropylene resin is used therefor, it is preferable that the tensile elastic modulus be approximately 700 MPa according to the testing method defined by ASTM Test Method D638. Furthermore, other than synthetic resin, metal materials may also be used therefor.

As the porous materials constituting the strip-shaped sound absorbent 12, resin foam can be used, and it is particularly preferable that urethane foam be used. Other than resin foam, the porous materials may be non-woven fabric cloth such as felt or mat where fibers are bonded. In the resin foam, it is desirable that a configuration of foam be an interconnecting cell. In a case of resin foam represented by urethane foam, it is possible to change the sound absorbing characteristics with respect to frequencies, on the basis of a density and a pore size thereof. For example, it is possible to arbitrarily adjust the porous material as one having a relatively high sound absorption coefficient at the frequency of 200 Hz, as one having a relatively high sound absorption coefficient at the frequency of 1 kHz, or as one having a relatively high sound absorption coefficient at the frequency of 1.5 kHz. In particular, the density of urethane foam presenting a sound absorption coefficient not less than 20% at the frequency of 200 Hz is between 20 kg/m$^3$ and 40 kg/m$^3$, and the density of urethane foam presenting a sound absorption coefficient not less than 25% at the frequency of 1 kHz is between 5 kg/m$^3$ and 20 kg/m$^3$. "A sound absorption coefficient" mentioned in the present invention is a sound absorption coefficient defined in JIS A1405.

FIGS. 3A to 3D show the strip-shaped sound absorbent formed of two kinds of porous materials A and B. In each of FIGS. 3A to 3D, a strip-shaped sound absorbent, which exists in a fashion extending around the entire circumference of the tread portion, is shown in a linearly unfolded state for the purpose of facilitating understanding of the drawings. Therein, sound absorbing portions formed of an identical porous material are indicated by an identical pattern. As shown in each of FIGS. 3A to 3D, in the strip-shaped sound absorbent 12, sound absorbing portions 12A and 12B respectively formed of porous materials different from each other are not stacked in the thickness direction thereof, but are alternately aligned in the circumferential direction or in the width direction of the tire. That is, the sound absorbing portions 12A and 12B exist in a mixed manner in the plane direction of the strip-shaped sound absorbent 12.

The sound absorbing portion 12A of the strip-shaped sound absorbent 12 is formed of a porous material A whose sound absorption coefficient at the frequency of 200 Hz is not less than 20%. In a case where the porous material A whose sound absorption coefficient at the frequency of 200 Hz is not less than 20% is selected, it is possible to effectively reduce cavity resonance around that frequency.

The sound absorbing portion 12B of the strip-shaped sound absorbent 12 is formed of a porous material B whose sound absorption coefficient at the frequency of 1 kHz is not less than 25%. In a case where the porous material B whose sound absorption coefficient at the frequency of 1 kHz is not less than 25% is selected, it is possible to effectively reduce high-frequency noise around that frequency.

Figure 4:
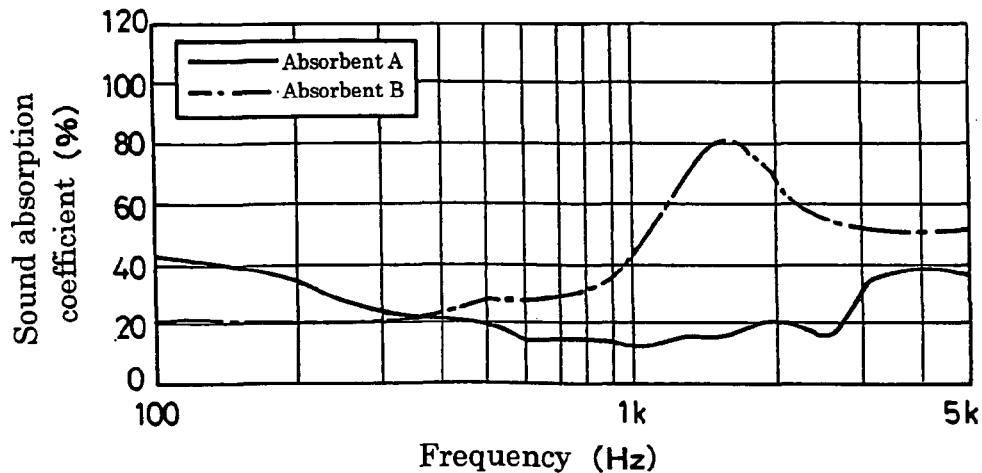
FIG. 4 is a chart showing examples of sound absorbing characteristics respectively of the porous materials A and B.

FIG. 4 shows sound absorbing characteristics of the respective porous materials A and B. As shown in FIG. 4, a sound absorbent formed of a porous material A is provided with sound absorption characteristics where the sound absorption coefficient is higher at the frequency of 200 Hz than it is at the frequency of 1 kHz. On the other hand, a sound absorbent formed of a porous material B is provided with sound absorption characteristics where the sound absorption coefficient at the frequency of 200 Hz is relatively low and a peak sound absorption coefficient appears around the frequency of 1 kHz. By allowing the two kinds of sound absorbents to respectively hold sound absorption effects in frequency bands different from each other, it becomes possible to simultaneously reduce cavity resonance and high-frequency noise, and thereby it becomes possible to effectively reduce noise when a vehicle is traveling.

Particularly, it becomes possible to reduce both the cavity resonance and the high-frequency noise in a well-balanced manner when the surface area of the absorption portions 12A is between 30% and 70% of the entire surface area of the strip-shaped sound absorbent 12, and when the surface area of the absorption portions 12B is between 30% and 70% of the entire surface area of the strip-shaped sound absorbent 12. When these ratios with respect to surface area fall out of the above ranges, it becomes difficult to reduce noise in a well-balanced manner when a vehicle is traveling.

Figure 5A:
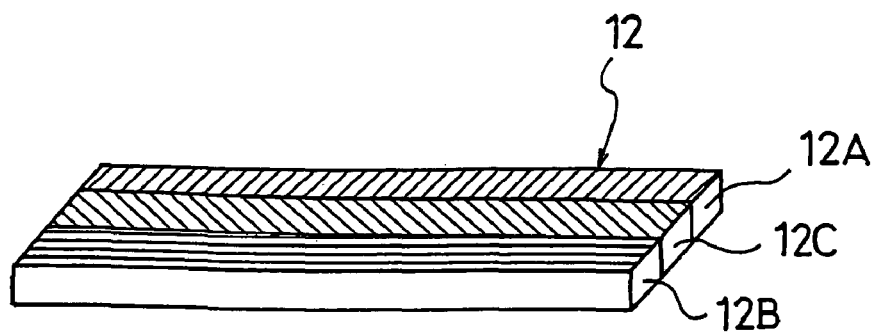
FIGS. 5A to 5C are perspective views each showing a strip-shaped sound absorbent formed of three kinds of porous materials in a linearly unfolded state.
Figure 5B:
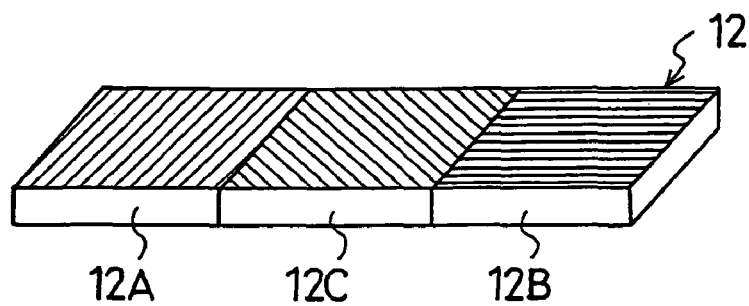
Figure 5C:
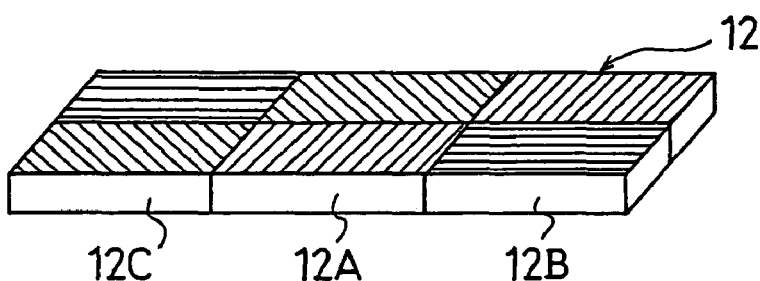

Each of FIGS. 5A to 5C shows a strip-shaped sound absorbent formed of three kinds of porous materials A, B and C. In each of FIGS. 5A to 5C, the strip-shaped sound absorbent, which exists in a fashion extending around the entire circumference of the tread portion, is shown in a linearly unfolded state for the purpose of facilitating understanding of the drawings. Therein, sound absorbing portions formed of the an identical porous material are indicated by an identical pattern. As shown in FIGS. 5A to 5C, in a strip-shaped sound absorbent 12, sound absorbing portions 12A, 12B and 12C respectively formed of porous materials different from one another are not stacked in the thickness direction thereof, but are arranged in a manner that they are alternately aligned in the circumferential direction or in the width direction of the tire. That is, the sound absorbing portions 12A, 12B and 12C exist in a mixed manner in the plane direction of the strip-shaped sound absorbent 12.

The sound absorbing portion 12A of the strip-shaped sound absorbent 12 is formed of the porous material A whose sound absorption coefficient at the frequency of 200 Hz is not less than 20%. In a case where the porous material A whose sound absorption coefficient at the frequency of 200 Hz is not less than 20% is selected, it is possible to effectively reduce cavity resonance around that frequency.

The sound absorbing portion 12B of the strip-shaped sound absorbent 12 is formed of the porous material B whose sound absorption coefficient at the frequency of 1 kHz is not less than 25%. In a case where the porous material B whose sound absorption coefficient at the frequency of 1 kHz is not less than 25% is selected, it is possible to effectively reduce high-frequency noise around that frequency.

The sound absorbing portion 12C of the strip-shaped sound absorbent 12 is formed of the porous material C whose sound absorption coefficient at the frequency of 1.5 kHz is not less than 30%, and more preferably, not less than 60%. In a case where the porous material C whose sound absorption coefficient at the frequency of 1.5 kHz is not less than 30% is selected, it is possible to effectively reduce high-frequency noise around that frequency.

Figure 6:
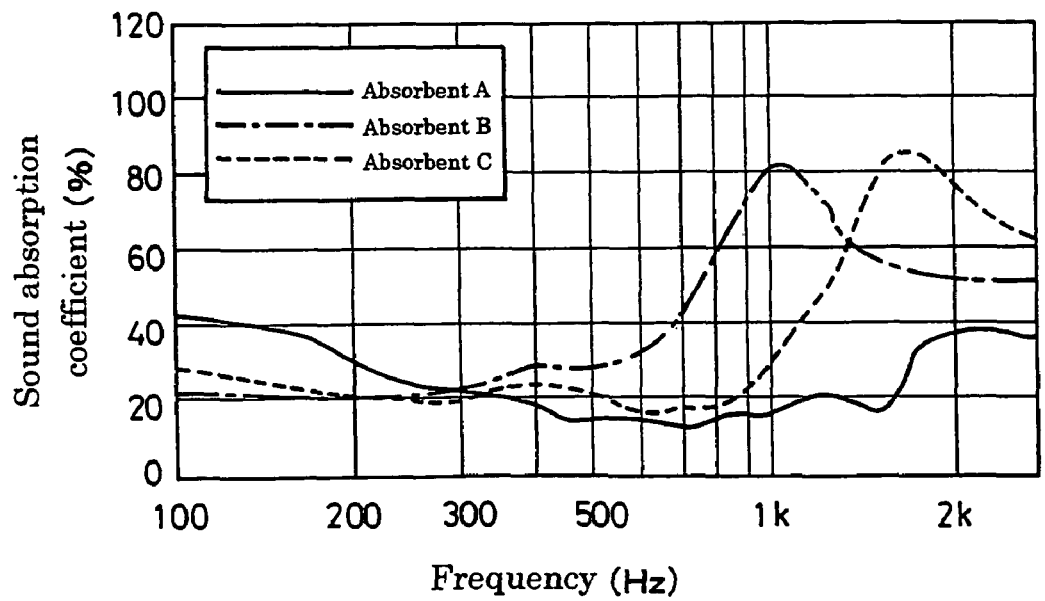
FIG. 6 is a chart showing examples of sound absorbing characteristics respectively of the porous materials A, B and C.

FIG. 6 shows sound absorbing characteristics of the respective porous materials A, B and C. As shown in FIG. 6, the sound absorbent formed of the porous material A is provided with sound absorption characteristics where the sound absorption coefficient is higher at the frequency of 200 Hz than it is at the frequency of 1 kHz and at that of 1.5 kHz. On the other hand, the sound absorbent formed of the porous material B is provided with sound absorption characteristics where the sound absorption coefficient at the frequency of 200 Hz is relatively low and a peak sound absorption coefficient appears around the frequency of 1 kHz. The sound absorbent formed of the porous material C is provided with sound absorption characteristics where the sound absorption coefficient at the frequency of 200 Hz is relatively low and a peak sound absorption coefficient appears around the frequency of 1.5 kHz. By allowing these three kinds of the sound absorbents to respectively hold sound absorption effects in frequency bands different from one another, it becomes possible to simultaneously reduce cavity resonance and high-frequency noise, and thereby it becomes possible to effectively reduce noise when a vehicle is traveling.

Particularly, it is possible to reduce both the cavity resonance and the high-frequency noise in a well-balanced manner particularly when the surface area of the sound absorbing portions 12A formed of the porous material A is between 30% and 50% of the surface area of the entire strip-shaped sound absorbent 12, when the surface area of the sound absorbing portions 12B formed of the porous material B is between 20% and 30% of the surface area of the entire strip-shaped sound absorbent 12, and when the surface area of the sound absorbing portions 12C formed of the porous material C is between 20% and 50% of a surface area of the entire strip-shaped sound absorbent 12. When these ratios with respect to surface areas fall out of the above ranges, it becomes difficult to reduce noise in a well-balanced manner when a vehicle is traveling.

Figure 7A:
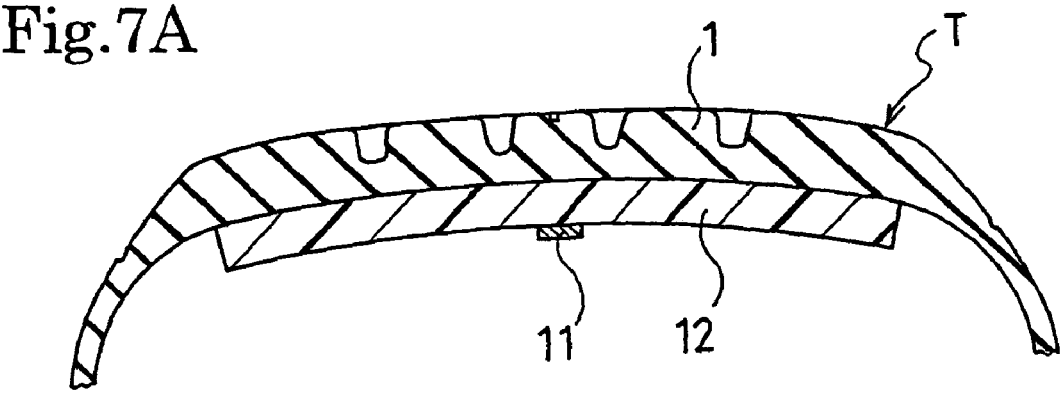
FIGS. 7A to 7C are cross-sectional views each showing an installation structure of a strip-shaped sound absorbent by means of an elastic fixing band.
Figure 7B:
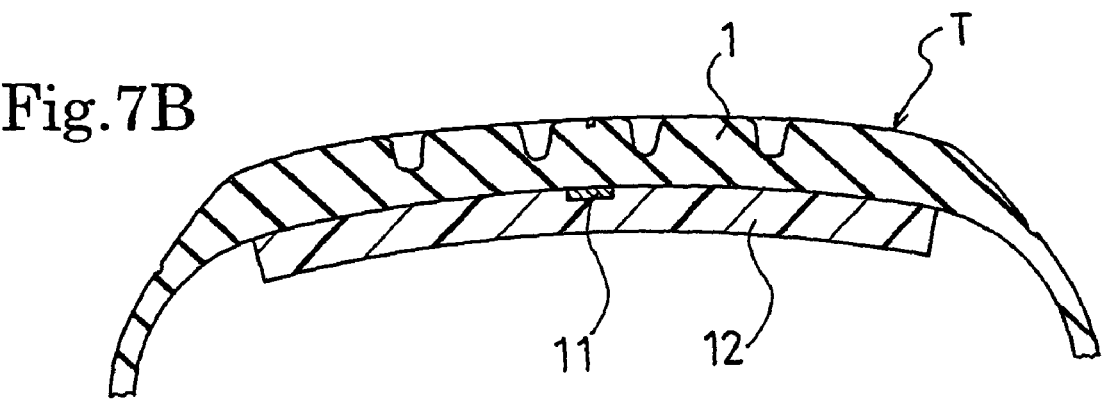
Figure 7C:
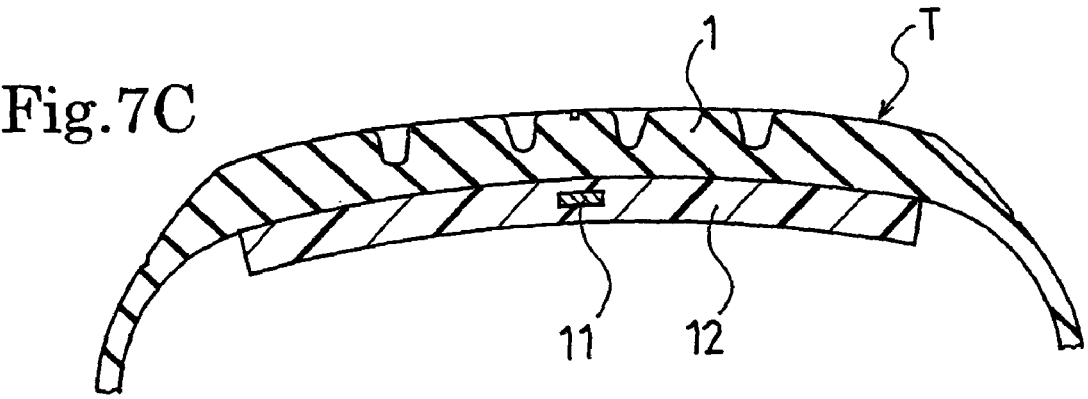

Each of FIGS. 7A to 7C shows an installation structure of the strip-shaped sound absorbent by means of an elastic fixing band. In FIG. 7A, the elastic fixing band 11 is arranged on a surface of the inner periphery of the strip-shaped sound absorbent 12. In FIG. 7B, the elastic fixing band 11 is arranged on a surface of the outer periphery of the strip-shaped sound absorbent 12. In FIG. 7C, the elastic fixing band 11 penetrates the inside of the strip-shaped sound absorbent 12. As described herein, a positional relation between the elastic fixing band 11 and the strip-shaped sound absorbent 12 in the radial direction of the tire is not particularly limited.

Figure 8:
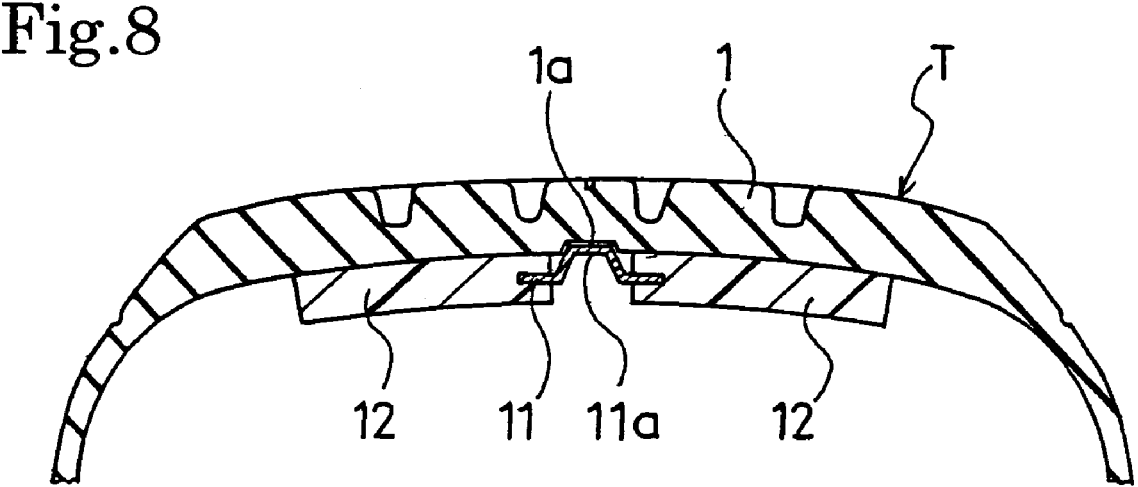
FIG. 8 is a cross-sectional view showing another installation structure of a strip-shaped sound absorbent by means of an elastic fixing band.

FIG. 8 shows another installation structure of the strip-shaped sound absorbent by means of the elastic fixing band. In FIG. 8, the strip-shaped sound absorbent 12 is divided in the width direction of the tire, and the annular elastic fixing band 11 is arranged between portions obtained by the division. In the elastic fixing band 11, each of end portions in the width direction thereof is buried into the strip-shaped sound absorbent 12, and there is provided, in a central portion in the width direction thereof, a swelling portion 11a projecting to the side of the outer periphery thereof. On the other hand, a groove 1a, which is continuous in the circumferential direction, is formed on the inner surface of the tread portion 1 of the pneumatic tire T, and the projecting portion 11a of the elastic fixing band 11 is formed to be engaged with this continuous groove 1a. According to the installation structure described herein, it is easy to determine positions when the strip-shaped sound absorbent 12 is installed, and moreover, there is an advantage that it becomes difficult for the attached strip-shaped sound absorbent 12 to be displaced.

While the detailed descriptions have been given of the preferred embodiments of the present invention hereinabove, it should be understood that various modifications to, substitutions for, and replacements with the preferred embodiments can be carried out as long as the modifications, the substitutions, and the replacements do not depart from the spirit and the scope of the present invention defined by the attached scope of claims.

EXAMPLES

Each of tires of Conventional Example, Comparative Example, and Examples 1 and 2 was prepared as a pneumatic tire having a tire size of 215/60R16 95H. In the tire of Conventional Example, no sound absorbent was installed onto the inner surface of the tread. In the tire of Comparative Example, a sound absorbent formed of the porous material A was installed onto the inner surface of the tread by means of a elastic fixing band. In the tire of Example 1, a sound absorbent formed of the porous materials A and B was installed onto the inner surface of the tread by means of a elastic fixing band. In the tire of Example 2, a sound absorbent formed of the porous materials A, B and C was installed onto the inner surface of the tread by means of the elastic fixing band. FIG. 6 shows sound absorbing characteristics of the above-mentioned porous materials.

In Example 1, the surface area of the sound absorbing portions formed of the porous material A was set to 50% of the surface area of the entire strip-shaped sound absorbent, and the surface area of the sound absorbing portions formed of the porous material B was set to 50% of the surface area of the entire strip-shaped sound absorbent. In Example 2, the surface area of the sound absorbing portions formed of the porous material A was set to 50% of the surface area of the entire strip-shaped sound absorbent, the surface area of the sound absorbing portions formed of the porous material B was set to 30% of the surface area of the entire strip-shaped sound absorbent, and the surface area of the sound absorbing portions formed of the porous material C was set to 20% of the surface area of the entire strip-shaped sound absorbent.

Using these test tires, vehicle interior noise was assessed by the following test method. Specifically, a set of each test tire were mounted onto wheels having a rim size of 16×6.5 JJ, and then were installed on a passenger vehicle of 2400 cc displacement, with the inflation pressure being 220 kPa. Then, a microphone was set at a position corresponding to an ear of a driver on the window side in the driver's seat of the vehicle. Then, a ⅓ octave band sound pressure levels (dB) were measured when the vehicle was traveling on a rough road surface at a speed of 80 km/h at frequencies of 200 Hz, 1 kHz and 1.5 kHz.

TABLE 1

|  |  | Conventional Example | Comparative Example | Example 1 | Example 2 |
| --- | --- | --- | --- | --- | --- |
| Vehicle interior noise | 200 Hz | 54 dB | 52 dB | 52 dB | 52 dB |
|  | 1 kHz | 30 dB | 30 dB | 28 dB | 28 dB |
|  | 1.5 kHz | 5 dB | 5 dB | 5 dB | 4 dB |

As shown in this Table 1, in both of Examples 1 and 2, reduction effects were obtained not only with respect to cavity resonance at frequencies around 200 Hz, but also with respect to high-frequency noise at frequencies around 1 kHz and at frequencies around 1.5 kHz.

What is claimed is:

1. A low noise pneumatic tire comprising a strip-shaped sound absorbent attached to an annular elastic fixing band and installed onto an inner surface of a tread of the tire taking advantage of the elastic force of the annular elastic fixing band, the strip-shaped sound absorbent having a mixed composition of at least two kinds of sound absorbing portions formed of at least two kinds of porous materials whose sound absorption characteristics with respect to frequencies are different from one another;

wherein the at least two kinds of sound absorbing portions are disposed in a mixed manner in a plane direction of the strip-shaped sound absorbent.

2. The low noise pneumatic tire according to claim 1, wherein the at least two kinds of sound absorbing portions are alternately aligned in a circumferential direction of the tire.

3. The low noise pneumatic tire according to claim 1, wherein the at least two kinds of sound absorbing portions are alternately aligned in a width direction of the tire.

4. The low noise pneumatic tire according to claim 1, wherein said strip-shaped sound absorbent is installed onto an entire circumference of the inner surface of the tread of the tire taking advantage of the elastic force of the annular elastic fixing band, the strip-shaped sound absorbent having the mixed composition of a sound absorbing portion formed of a first porous material whose sound absorbing coefficient at a frequency of 200 Hz is not less than 20%, and another sound absorbing portion formed of a second porous material whose sound absorbing coefficient at a frequency of 1 kHz is not less than 25%.

5. The low noise pneumatic tire according to claim 4, wherein the sound absorbing portion formed of the first porous material and the sound absorbing portion formed of the second porous material are alternately aligned in a circumferential direction of the tire.

6. The low noise pneumatic tire according to claim 4, wherein the sound absorbing portion formed of the first porous material and the sound absorbing portion formed of the second porous material are alternately aligned in a width direction of the tire.

7. The low noise pneumatic tire according to claim 4, wherein the sound absorbing portions formed of the first porous material and the sound absorbing portions formed of the second porous material are disposed in a mixed manner in the plane direction of the strip-shaped sound absorbent.

8. The low noise pneumatic tire according to any one of claims 4 to 7, wherein a surface area of the sound absorbing portions formed of the first porous material is between 30% and 70% of a surface area of the entire strip-shaped sound absorbent, and a surface area of the sound absorbing portions formed of the second porous material is between 30% and 70% of the surface area of the entire strip-shaped sound absorbent.

9. A low noise pneumatic tire according to claim 1, wherein said strip-shaped sound absorbent is installed onto the entire circumference of the inner surface of the tread of the tire taking advantage of the elastic force of the annular elastic fixing band, the strip-shaped sound absorbent having the mixed composition of a sound absorbing portion formed of a first porous material whose sound absorbing coefficient at a frequency of 200 Hz is not less than 20%, another sound absorbing portion formed of a second porous material whose sound absorbing coefficient at a frequency of 1 kHz is not less than 25%, and still another sound absorbing portion formed of a third porous material whose sound absorbing coefficient at a frequency of 1.5 kHz is not less than 30%.

10. The low noise pneumatic tire according to claim 9, wherein the sound absorbing portion formed of the first porous material, the sound absorbing portion formed of the second porous material, and the sound absorbing portion formed of the third porous material are alternately aligned in a circumferential direction of the tire.

11. The low noise pneumatic tire according to claim 9, wherein the sound absorbing portion formed of the first porous material, the sound absorbing portion formed of the second porous material, and the sound absorbing portion formed of the third porous material are alternately aligned in a width direction of the tire.

12. The low noise pneumatic tire according to claim 9, wherein the sound absorbing portions formed of the first porous material, the sound absorbing portions formed of the second porous material, and the sound absorbing portions formed of the third porous material are disposed in a mixed manner in the plane direction of the strip-shaped sound absorbent.

13. The low noise pneumatic tire according to any one of claims 9 to 12, wherein a surface area of the sound absorbing portions formed of the first porous material is between 30% and 50% of a surface area of the entire strip-shaped sound absorbent, a surface area of the sound absorbing portions formed of the second porous material is between 20% and 30% of the surface area of the entire strip-shaped sound absorbent, and a surface area of the sound absorbing portions formed of the third porous material is between 20% and 50% of the surface area of the entire strip-shaped sound absorbent.

* * * * *